United States Patent
McBean et al.

(10) Patent No.: US 11,692,548 B2
(45) Date of Patent: Jul. 4, 2023

(54) COMPRESSOR HAVING FLOATING SEAL ASSEMBLY

(71) Applicant: Emerson Climate Technologies, Inc., Sidney, OH (US)

(72) Inventors: James W. McBean, Bellefontaine, OH (US); Aasif M. Nadaf, Pune (IN); Shawn W. Vehr, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 102 days.

(21) Appl. No.: 16/864,987

(22) Filed: May 1, 2020

(65) Prior Publication Data

US 2021/0340982 A1 Nov. 4, 2021

(51) Int. Cl.
*F04C 27/00* (2006.01)
*F04C 18/02* (2006.01)
(Continued)

(52) U.S. Cl.
CPC ........ *F04C 27/008* (2013.01); *F04C 18/0215* (2013.01); *F04C 27/001* (2013.01);
(Continued)

(58) Field of Classification Search
CPC .. F04C 27/008; F04C 18/0215; F04C 27/001; F04C 28/26; F04C 27/005;
(Continued)

(56) References Cited

U.S. PATENT DOCUMENTS

| 2,294,105 A | 8/1942 | Wallgren |
| 2,592,082 A | 4/1952 | Trumpler |

(Continued)

FOREIGN PATENT DOCUMENTS

| CN | 1060699 A | 4/1992 |
| CN | 1113547 A | 12/1995 |

(Continued)

OTHER PUBLICATIONS

Office Action regarding European Patent Application No. 11837109.5, dated Apr. 26, 2021.

(Continued)

*Primary Examiner* — Dominick L Plakkoottam
*Assistant Examiner* — Paul W Thiede
(74) *Attorney, Agent, or Firm* — Harness, Dickey & Pierce, P.L.C.

(57) ABSTRACT

A compressor includes a shell, a first scroll member, a second scroll member and a sealing assembly. The shell defines a first pressure region and a second pressure region. The first scroll member is disposed within the shell and includes a first end plate and a first scroll wrap. The second scroll member includes a second end plate and a second scroll wrap. The second scroll wrap meshingly engages the first scroll wrap to define a compression chamber therebetween. The seal assembly fluidly separates the first and second pressure regions from each other. The seal assembly includes a first plate, a second plate, a first sealing member and a second sealing member. The first sealing member is sealingly engaged with the first plate and the second plate. The second sealing member is sealingly engaged with the first sealing member and the first plate.

16 Claims, 7 Drawing Sheets

(51) Int. Cl.
*F04C 28/26* (2006.01)
*F01C 19/00* (2006.01)
*B29D 99/00* (2010.01)
*F01C 19/08* (2006.01)

(52) U.S. Cl.
CPC .......... *F04C 28/26* (2013.01); *B29D 99/0085* (2013.01); *F01C 19/00* (2013.01); *F01C 19/005* (2013.01); *F01C 19/08* (2013.01); *F04C 27/005* (2013.01); *F04C 2270/185* (2013.01)

(58) Field of Classification Search
CPC ............. F04C 2270/185; F04C 28/265; B29D 99/0085; F01C 19/00; F01C 19/005; F01C 19/08
See application file for complete search history.

(56) References Cited

U.S. PATENT DOCUMENTS

| | | | |
|---|---|---|---|
| 2,867,462 | A | 1/1959 | Nielsen |
| 3,306,683 | A | 2/1967 | Deuring |
| 3,511,512 | A | 5/1970 | Wheelock |
| 3,600,114 | A | 8/1971 | Dvorak et al. |
| 3,707,852 | A | 1/1973 | Burckhardt et al. |
| 4,116,452 | A | 9/1978 | Schanz |
| 4,596,520 | A | 6/1986 | Arata et al. |
| 4,655,462 | A | 4/1987 | Balsells |
| 4,669,737 | A | 6/1987 | Diffenderfer |
| 4,869,514 | A | 9/1989 | Bogdanovic |
| 4,877,382 | A | 10/1989 | Caillat et al. |
| 4,940,080 | A | 7/1990 | Reeves et al. |
| 4,993,928 | A | 2/1991 | Fraser, Jr. |
| 5,105,879 | A | 4/1992 | Ross |
| 5,156,539 | A | 10/1992 | Anderson et al. |
| 5,311,748 | A | 5/1994 | Bahel et al. |
| 5,342,183 | A | 8/1994 | Rafalovich et al. |
| 5,407,335 | A | 4/1995 | Caillat et al. |
| 5,435,707 | A | 7/1995 | Hirano et al. |
| 5,447,418 | A | 9/1995 | Takeda et al. |
| 5,447,420 | A | 9/1995 | Caillat et al. |
| 5,494,422 | A | 2/1996 | Ukai et al. |
| RE35,216 | E * | 4/1996 | Anderson ............ F04C 28/265 |
| | | | 417/310 |
| 5,503,542 | A | 4/1996 | Grassbaugh et al. |
| 5,540,572 | A | 7/1996 | Park et al. |
| 5,545,019 | A * | 8/1996 | Beck ...................... F04C 28/06 |
| | | | 188/82.1 |
| 5,562,435 | A | 10/1996 | Cho et al. |
| 5,588,819 | A * | 12/1996 | Wallis ................. F04C 29/0057 |
| | | | 418/57 |
| 5,588,820 | A | 12/1996 | Hill et al. |
| 5,607,288 | A | 3/1997 | Wallis et al. |
| 5,613,841 | A | 3/1997 | Bass et al. |
| 5,707,210 | A | 1/1998 | Ramsey et al. |
| 5,800,141 | A | 9/1998 | Ceylan et al. |
| 5,803,716 | A | 9/1998 | Wallis et al. |
| 5,921,761 | A | 7/1999 | Eckels |
| 6,027,321 | A | 2/2000 | Shim et al. |
| 6,048,184 | A | 4/2000 | Chang et al. |
| 6,059,549 | A | 5/2000 | Tarng et al. |
| 6,077,057 | A | 6/2000 | Hugenroth et al. |
| 6,095,765 | A | 8/2000 | Khalifa |
| 6,135,739 | A | 10/2000 | Ogawa et al. |
| 6,146,119 | A | 11/2000 | Bush et al. |
| 6,164,660 | A | 12/2000 | Goodman |
| 6,171,088 | B1 | 1/2001 | Sun et al. |
| 6,267,565 | B1 | 7/2001 | Seibel et al. |
| 6,419,457 | B1 | 7/2002 | Seibel et al. |
| 6,631,685 | B2 | 10/2003 | Hewitt |
| 6,821,092 | B1 | 11/2004 | Gehret et al. |
| 6,913,448 | B2 | 7/2005 | Liang et al. |
| 6,984,115 | B1 | 1/2006 | Tarng et al. |
| 7,070,401 | B2 | 7/2006 | Clendenin et al. |
| 7,140,851 | B2 | 11/2006 | Tarng |
| 7,338,265 | B2 | 3/2008 | Grassbaugh et al. |
| 7,491,045 | B2 | 2/2009 | Masuda |
| 7,543,822 | B2 | 6/2009 | Grimanis et al. |
| 7,568,897 | B2 | 8/2009 | Grassbaugh et al. |
| 7,611,345 | B2 | 11/2009 | Huang et al. |
| 8,033,803 | B2 | 10/2011 | Stover |
| 8,043,078 | B2 | 10/2011 | Stover et al. |
| 8,287,257 | B2 | 10/2012 | Dunaevsky |
| 8,932,036 | B2 | 1/2015 | Monnier et al. |
| 9,121,276 | B2 * | 9/2015 | Heidecker ............ F04C 27/008 |
| 10,215,175 | B2 | 2/2019 | Ignatiev et al. |
| 10,975,868 | B2 | 4/2021 | Jorwekar et al. |
| 2002/0026806 | A1 | 3/2002 | Tsuboe et al. |
| 2002/0119063 | A1 | 8/2002 | Morozumi |
| 2003/0012659 | A1 | 1/2003 | Seibel et al. |
| 2003/0063982 | A1 | 4/2003 | Pham |
| 2004/0071571 | A1 | 4/2004 | Uchida et al. |
| 2004/0136854 | A1 | 7/2004 | Kimura et al. |
| 2005/0123428 | A1 | 6/2005 | Uchida et al. |
| 2005/0142017 | A1 | 6/2005 | Liang et al. |
| 2005/0265880 | A1 | 12/2005 | Chang et al. |
| 2006/0198748 | A1 | 9/2006 | Grassbaugh et al. |
| 2006/0233657 | A1 * | 10/2006 | Bonear .................. F04C 28/28 |
| | | | 418/55.6 |
| 2007/0036661 | A1 | 2/2007 | Stover |
| 2007/0224071 | A1 | 9/2007 | Wang |
| 2008/0101972 | A1 | 5/2008 | Tarng et al. |
| 2008/0159895 | A1 | 7/2008 | Huang et al. |
| 2008/0175737 | A1 | 7/2008 | Grassbaugh et al. |
| 2009/0060767 | A1 | 3/2009 | Zamudio |
| 2009/0098001 | A1 | 4/2009 | Ni |
| 2009/0169405 | A1 | 7/2009 | Suefuji et al. |
| 2009/0185926 | A1 | 7/2009 | Bush |
| 2009/0185935 | A1 | 7/2009 | Seibel et al. |
| 2009/0246059 | A1 | 10/2009 | Nakamura et al. |
| 2010/0254841 | A1 | 10/2010 | Akei et al. |
| 2010/0303659 | A1 | 12/2010 | Stover et al. |
| 2011/0293456 | A1 | 12/2011 | Seibel et al. |
| 2012/0148433 | A1 | 6/2012 | Liang et al. |
| 2012/0258002 | A1 | 10/2012 | Rose |
| 2013/0078128 | A1 | 3/2013 | Akei |
| 2014/0023541 | A1 | 1/2014 | Heidecker et al. |
| 2014/0271306 | A1 | 9/2014 | Kim et al. |
| 2015/0316055 | A1 | 11/2015 | Jin et al. |
| 2015/0316058 | A1 | 11/2015 | Jin et al. |
| 2019/0010944 | A1 | 1/2019 | Jorwekar et al. |
| 2019/0178250 | A1 | 6/2019 | DeFord et al. |

FOREIGN PATENT DOCUMENTS

| | | |
|---|---|---|
| CN | 1184894 A | 6/1998 |
| CN | 1286358 A | 3/2001 |
| CN | 1415913 A | 5/2003 |
| CN | 1576605 A | 2/2005 |
| CN | 1828022 A | 9/2006 |
| CN | 101046204 A | 10/2007 |
| CN | 102449313 A | 5/2012 |
| CN | 203214294 U | 9/2013 |
| CN | 104061157 A | 9/2014 |
| CN | 209180006 U | 7/2019 |
| EP | 0482209 A1 | 4/1992 |
| EP | 0747598 A2 | 12/1996 |
| EP | 1698784 B1 | 3/2013 |
| JP | H05149269 A | 6/1993 |
| JP | H06346871 A | 12/1994 |
| JP | H08296572 A | 11/1996 |
| KR | 20020030018 A | 4/2002 |
| KR | 20180065340 A | 6/2018 |
| RU | 2064050 C1 | 7/1996 |
| WO | WO-2009035640 A1 | 3/2009 |
| WO | WO-2016049464 A1 | 3/2016 |

OTHER PUBLICATIONS

International Search Report from the ISA regarding Application No. PCT/US2021/029179 dated Aug. 2, 2021.

(56) References Cited

OTHER PUBLICATIONS

Written Opinion of the ISA regarding Application No. PCT/US2021/029179 dated Aug. 2, 2021.
Written Opinion of the ISA regarding Application No. PCT/US2021/032036 dated Aug. 24, 2021.
International Search Report regarding Application No. PCT/US2021/032036 dated Aug. 24, 2021.
U.S. Appl. No. 16/883,323, filed May 26, 2020, James A. Schaefer et al.
International Search Report regarding International Application No. PCT/US2011/058128, dated Apr. 10, 2012.
Written Opinion of the International Searching Authority regarding International Application No. PCT/US2011/058128, dated Apr. 10, 2012.
Office Action regarding U.S. Appl. No. 13/283,097, dated Jan. 30, 2014.
Office Action regarding Russian Patent Application No. 2013124425, dated Jun. 9, 2014. Translation provided by Gowlings International Inc.
Office Action regarding U.S. Appl. No. 13/283,097, dated Jul. 9, 2014.
Office Action regarding Chinese Patent Application No. 201180052695.2, dated Feb. 2, 2015. Translation provided by Unitalen Attorneys at Law.
Office Action regarding Chinese Patent Application No. 201180052695.2, dated Oct. 9, 2015. Translation provided by Unitalen Attorneys at Law.
Office Action regarding Chinese Patent Application No. 201180052695.2, dated Mar. 17, 2016. Translation provided by Unitalen Attorneys at Law.
Search Report regarding European Patent Application No. 11837109.5, dated Jun. 8, 2016.
Office Action regarding European Patent Application No. 11837109.5, dated Nov. 17, 2017.
Office Action regarding Chinese Patent Application No. 201610608786.4, dated Jan. 23, 2018. Translation provided by Unitalen Attorneys at Law.
Office Action regarding Indian Patent Application No. 735/MUMNP/2013, dated Jun. 6, 2018.
Office Action regarding Chinese Patent Application No. 201610608786.4, dated Sep. 10, 2018. Translation provided by Unitalen Attorneys at Law.
Office Action regarding Chinese Patent Application No. 201810735714.5, dated Jun. 3, 2019. Translation provided by Unitalen Attorneys at Law.
Office Action regarding European Patent Application No. 11837109.5, dated Jun. 18, 2019.
Office Action regarding Chinese Patent Application No. 201810735714.5, dated Nov. 27, 2019. Translation provided by Unitalen Attorneys at Law.
Office Action regarding Indian Patent Application No. 201721023952, dated Nov. 27, 2019.
Office Action regarding European Patent Application No. 11837109.5, dated Mar. 9, 2020.
Restriction Requirement regarding U.S. Appl. No. 16/025,050, dated Jun. 5, 2020.
International Search Report regarding Application No. PCT/US2021-033899 dated Sep. 6, 2021.
Written Opinion of the ISA regarding Application No. PCT/US2021/033899 dated Sep. 6, 2021.
Non-Final Office Action regarding U.S. Appl. No. 16/883,323 dated Feb. 2, 2022.
Notice of Allowance regarding U.S. Appl. No. 16/025,050, dated Dec. 24, 2020.
U.S. Appl. No. 15/930,616, filed May 13, 2020, Yogesh S. Mahure.
Office Action regarding U.S. Appl. No. 16/025,050, dated Jul. 27, 2020.
Office Action regarding Indian Patent Application No. 201824024885, dated Aug. 11, 2020.
International Search Report regarding Application No. PCT/US2022/013142 dated May 3, 2022.
Written Opinion regarding Application No. PCT/US2022/013142 dated May 3, 2022.
Non-Final Office Action regarding U.S. Appl. No. 15/930,616 dated Apr. 26, 2022.

\* cited by examiner

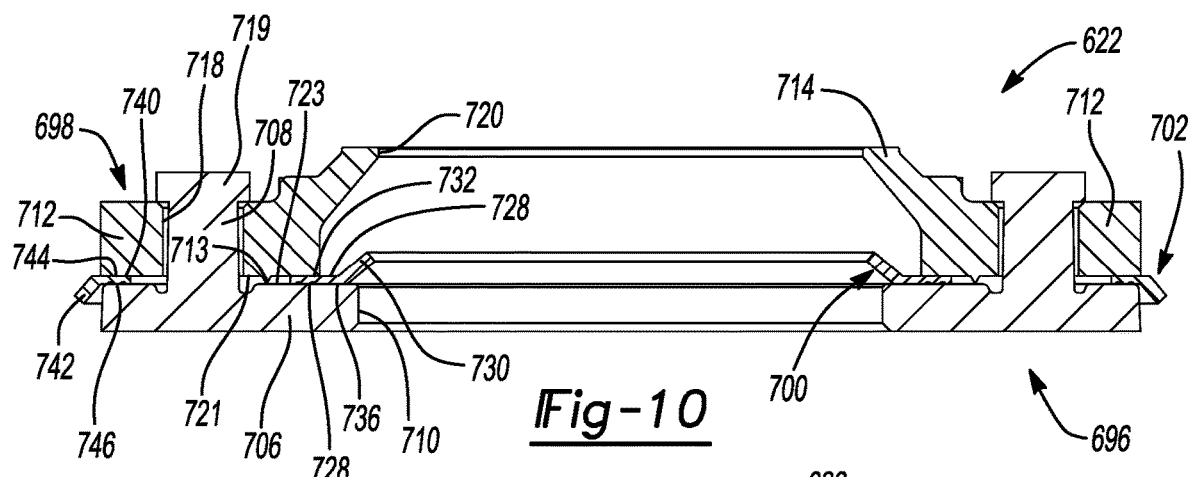
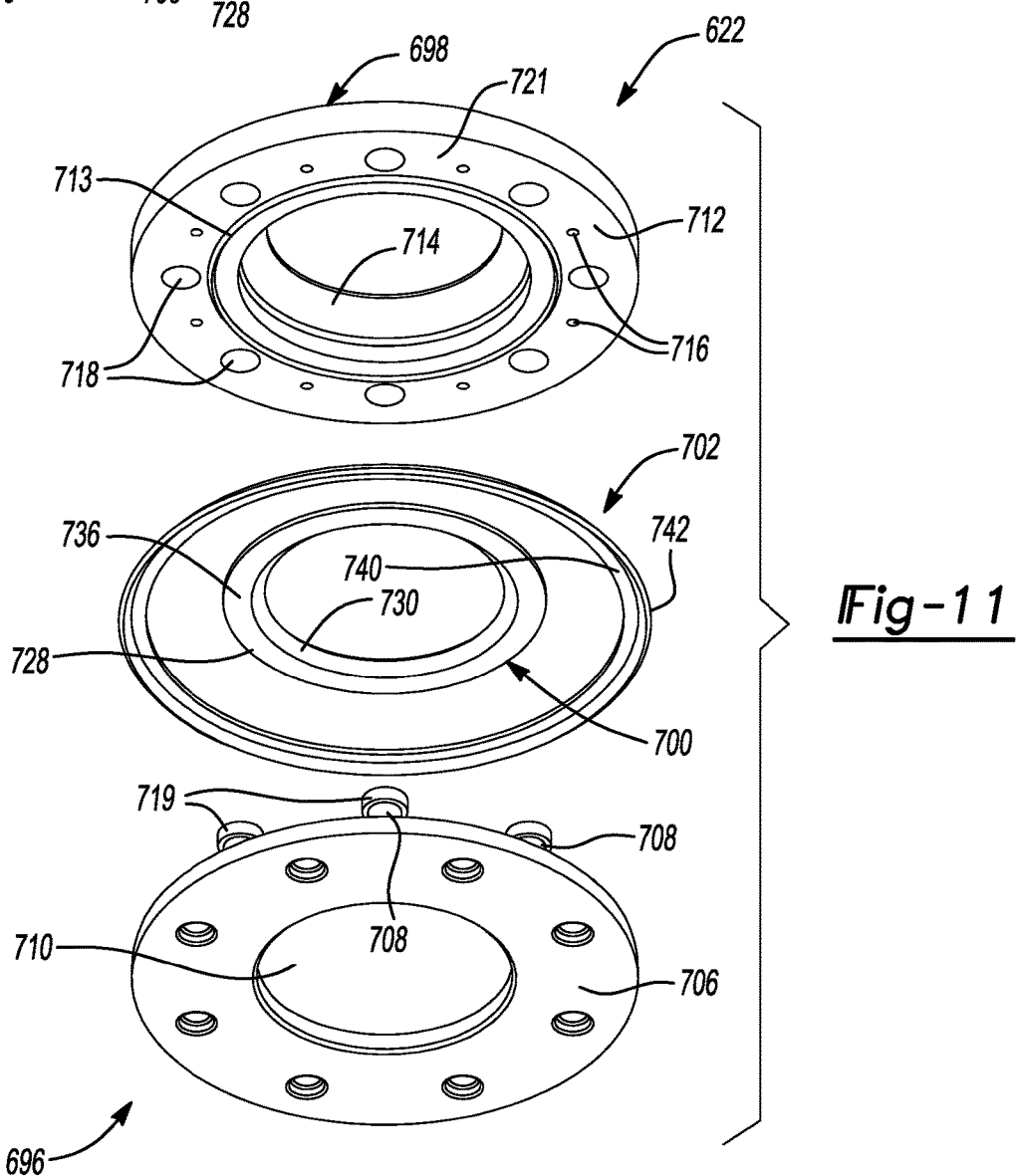

COMPRESSOR HAVING FLOATING SEAL ASSEMBLY

FIELD

The present disclosure relates to a compressor having a floating seal assembly and more particularly for use in scroll compressors utilizing low Global Warming Potential (LGWP) refrigerants.

BACKGROUND

This section provides background information related to the present disclosure and is not necessarily prior art.

Heat-pump systems and other working fluid circulation systems include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Efficient and reliable operation of the compressor is desirable to ensure that the heat-pump system in which the compressor is installed is capable of effectively and efficiently providing a cooling and/or heating effect on demand. Compressors used in heat-pump systems utilizing LGWP refrigerants must operate at higher temperatures than those utilizing conventional refrigerants due to the higher heat of compression of the LGWP refrigerants. These higher temperatures require improvements in the design of the seals used in such compressors to maintain the desired compression ratios and efficiency.

SUMMARY

This section provides a general summary of the disclosure, and is not a comprehensive disclosure of its full scope or all of its features.

In one form, the present disclosure discloses a compressor including a shell, first scroll, a second scroll and a seal assembly. The shell defines a first pressure region and a second pressure region. The first scroll member is disposed within the shell and includes a first end plate and a first scroll wrap. The first end plate defines an annular recess and a discharge passage. The discharge passage is in communication with the first pressure region. The second scroll member includes a second end plate and a second scroll wrap. The second scroll wrap meshingly engages the first scroll wrap to define a compression chamber therebetween. The seal assembly is at least partially disposed in the annular recess and fluidly separates the first and second pressure regions from each other. The seal assembly includes a first plate, a second plate, a first sealing member and a second sealing member. The first and second plates surround the discharge passage. The first sealing member is sealingly engaged with the first plate and the second plate to restrict fluid flow from the first pressure region to the second pressure region. The second sealing member is sealingly engaged with the first sealing member and the first plate to further restrict fluid flow from the first pressure region to the second pressure region.

In some configurations of the compressor of the above paragraph, the second sealing member is an O-ring.

In some configurations of the compressor of any one or more of the above paragraphs, the second sealing member is sealingly engaged with an upper surface of the first sealing member to further restrict fluid flow from the first pressure region to the second pressure region via the upper surface of the first sealing member.

In some configurations of the compressor of any one or more of the above paragraphs, the first pressure region is a discharge pressure chamber and the second pressure region is a suction pressure chamber.

In some configurations of the compressor of any one or more of the above paragraphs, the first plate includes an annular groove formed in a surface thereof. The second sealing member is disposed within the annular groove and is sealingly engaged with a first upper surface of the first sealing member to further restrict fluid flow from the first pressure region to the second pressure region.

In some configurations of the compressor of any one or more of the above paragraphs, the surface of the first plate faces a second upper surface of the second plate.

In some configurations of the compressor of any one or more of the above paragraphs, the first plate includes a vent hole formed therein and in communication with the second pressure region. The second sealing member is sealingly engaged with the first sealing member and the first plate at a location radially inwardly relative to the vent hole.

In another form, the present disclosure provides a compressor that includes a shell, a first scroll member, a second scroll member and a seal assembly. The shell defines a first pressure region and a second pressure region. The first scroll member is disposed within the shell and includes a first end plate and a first scroll wrap. The first end plate defines a discharge passage. The discharge passage is in communication with the first pressure region. The second scroll member includes a second end plate and a second scroll wrap. The second scroll wrap meshingly engages the first scroll wrap to define a compression chamber therebetween. The seal assembly fluidly separates the first and second pressure regions from each other. The seal assembly includes a first plate, a second plate, a first sealing member and a second sealing member. The first end plate defines an annular groove formed therein. The first sealing member is sealingly engaged with the first plate and the second plate to restrict fluid flow from the first pressure region to the second pressure region. The second sealing member is at least partially disposed within the annular groove and sealingly engaged with a surface of the annular groove to further restrict fluid flow from the first pressure region to the second pressure region.

In some configurations of the compressor of the above paragraph, the first pressure region is a discharge pressure chamber and the second pressure region is a suction pressure chamber.

In some configurations of the compressor of any one or more of the above paragraphs, the first sealing member and the second sealing member are integrally formed with each other.

In some configurations of the compressor of any one or more of the above paragraphs, the second sealing member is integrally formed with the first sealing member at a periphery of the first sealing member.

In some configurations of the compressor of any one or more of the above paragraphs, the first plate includes a vent hole formed therein and in communication with the second pressure region. The second sealing member is sealingly engaged with the first plate at a location radially inwardly relative to the vent hole.

In some configurations of the compressor of any one or more of the above paragraphs, the second plate defines a biasing chamber containing fluid at an intermediate fluid pressure. The first plate defines another annular groove formed therein that a third sealing member is disposed in to restrict fluid flow from the biasing chamber to the second pressure region.

In some configurations of the compressor of any one or more of the above paragraphs, a fourth sealing member is sealingly engaged with the first plate and the second plate. The third sealing member and the fourth sealing member are integrally formed with the each other.

In some configurations of the compressor of any one or more of the above paragraphs, the first plate includes a vent hole formed therein and in communication with the second pressure region. The third sealing member is sealingly engaged with a surface of the other annular groove at a location radially outwardly relative to the vent hole.

In some configurations of the compressor of any one or more of the above paragraphs, the third sealing member is integrally formed with the fourth sealing member at a periphery of the fourth sealing member.

In yet another form, the present disclosure discloses a compressor that includes a shell, a first scroll member, a second scroll member and a seal assembly. The shell defines a first pressure region and a second pressure region. The first scroll member is disposed within the shell and includes a first end plate and a first scroll wrap. The first end plate defines a discharge passage in communication with the first pressure region. The second scroll member includes a second end plate and a second scroll wrap. The second scroll wrap meshingly engages the first scroll wrap to define a compression chamber therebetween. The seal assembly fluidly separates the first and second pressure regions from each other. The seal assembly includes a first plate, a second plate, and a sealing member. The first and second plates surround the discharge passage. The first sealing member is sealingly engaged with the first plate and the second plate to restrict fluid flow from the first pressure region to the second pressure region. One of the first plate and the second plate includes an annular protrusion extending therefrom and sealingly engaged with the other of the first plate and second plate to further restrict fluid flow from the first pressure region to the second pressure region.

In some configurations of the compressor of the above paragraph, the first plate includes the annular protrusion extending therefrom and sealingly engaged with an upper surface of the second plate.

In some configurations of the compressor of any one or more of the above paragraphs, the second plate includes the annular protrusion extending therefrom and sealingly engaged with a lower surface of the first plate.

In some configurations of the compressor of any one or more of the above paragraphs, the second plate defines a biasing chamber containing fluid at an intermediate fluid pressure. The second plate includes another annular protrusion extending therefrom and sealingly engaged with the lower surface of the first plate to restrict fluid flow from the biasing chamber to the second pressure region.

In some configurations of the compressor of any one or more of the above paragraphs, the first plate includes a vent hole formed therein and in communication with the second pressure region. The other annular protrusion is sealingly engaged with the lower surface of the first plate at a location radially outwardly relative to the vent hole.

In some configurations of the compressor of any one or more of the above paragraphs, another sealing member is sealingly engaged with the first plate and the second plate. The other annular protrusion is sealingly engaged with the lower surface of the first plate at a location radially inwardly relative to the other sealing member.

In some configurations of the compressor of any one or more of the above paragraphs, the first pressure region is a discharge pressure chamber and the second pressure region is a suction pressure chamber.

In some configurations of the compressor of any one or more of the above paragraphs, the first plate includes a vent hole formed therein and in communication with the second pressure region. The protrusion of the one of the first plate and the second plate is sealingly engaged with the other of the first plate and the second plate at a location radially inwardly relative to the vent hole.

In some configurations of the compressor of any one or more of the above paragraphs, the protrusion of the one of the first plate and the second plate is sealingly engaged with the other of the first plate and the second plate at a location radially outwardly relative to the sealing member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a cross-sectional view of yet another floating seal assembly; and

FIG. 11 is an exploded view of the floating seal assembly of FIG. 10.

Corresponding reference numerals indicate corresponding parts throughout the several views of the drawings.

DETAILED DESCRIPTION

Figure 1:
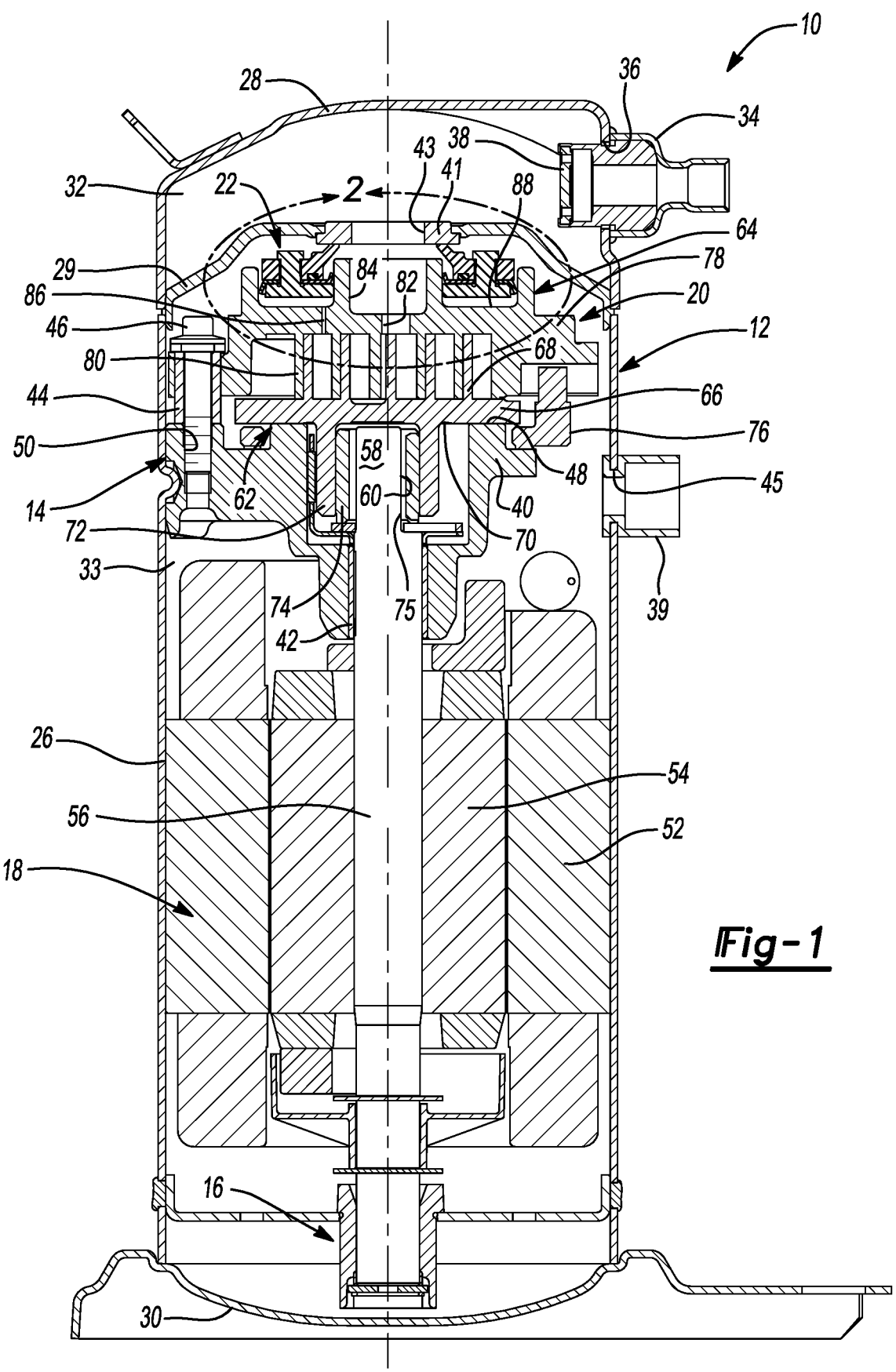
FIG. 1 is a cross-sectional view of a compressor including a floating seal assembly in accordance with the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIG. 1, a compressor 10 is provided that may include a hermetic shell assembly 12, a first bearing housing assembly 14, a second bearing housing assembly 16, a motor assembly 18, a compression mechanism 20, and a floating seal assembly 22.

The shell assembly 12 may form a compressor housing and may include a cylindrical shell 26, an end cap 28 at an upper end thereof, a transversely extending partition 29, and a base 30 at a lower end thereof. The end cap 28 and the partition 29 may define a discharge chamber 32. The partition 29 may separate the discharge chamber 32 from a suction chamber 33. The partition 29 may include a wear ring 41 and a discharge passage 43 extending therethrough to provide communication between the compression mechanism 20 and the discharge chamber 32. A discharge fitting 34 may be attached to the shell assembly 12 at an opening 36 in the end cap 28. A discharge valve assembly 38 may be disposed within the discharge fitting 34 and may generally prevent a reverse flow condition. A suction inlet fitting 39 may be attached to shell assembly 12 at an opening 45.

The first bearing housing assembly 14 may be fixed relative to the shell 26 and may include a main bearing housing 40, a first bearing 42, sleeves guides or bushings 44, and fastener assemblies 46. The main bearing housing 40 may house the first bearing 42 therein and may define an annular flat thrust bearing surface 48 on an axial end surface thereof. The main bearing housing 40 may include apertures 50 extending therethrough and receiving the fastener assemblies 46.

The motor assembly 18 may include a motor stator 52, a rotor 54, and a drive shaft 56. The motor stator 52 may be press fit into the shell 26. The rotor 54 may be press fit on the drive shaft 56 and may transmit rotational power to the drive shaft 56. The drive shaft 56 may be rotatably supported within the first and second bearing housing assemblies 14, 16. The drive shaft 56 may include an eccentric crank pin 58 having a flat 60 thereon.

The compression mechanism 20 may include an orbiting scroll 62 and a non-orbiting scroll 64. The orbiting scroll 62 may include an end plate 66 having a spiral wrap 68 on an upper surface thereof and an annular flat thrust surface 70 on a lower surface. The thrust surface 70 may interface with the annular flat thrust bearing surface 48 on the main bearing housing 40. A cylindrical hub 72 may project downwardly from thrust surface 70 and may include a drive bushing 74 disposed therein. The drive bushing 74 may include an inner bore 75 in which the crank pin 58 is drivingly disposed. The crank pin flat 60 may drivingly engage a flat surface in a portion of the inner bore 75 to provide a radially compliant driving arrangement. An Oldham coupling 76 may be engaged with the orbiting and non-orbiting scrolls 62, 64 to prevent relative rotation therebetween.

The non-orbiting scroll 64 may include an end plate 78 and a spiral wrap 80 projecting downwardly from the end plate 78. The spiral wrap 80 may meshingly engage the spiral wrap 68 of the orbiting scroll 62, thereby creating a series of moving fluid pockets. The fluid pockets defined by the spiral wraps 68, 80 may decrease in volume as they move from a radially outer position (at a suction pressure) to a radially intermediate position (at an intermediate pressure) to a radially inner position (at a discharge pressure) throughout a compression cycle of the compression mechanism 20.

The end plate 78 may include a discharge passage 82, a discharge recess 84, an intermediate passage 86, and an annular recess 88. The discharge passage 82 is in communication with one of the fluid pockets at the radially inner position and allows compressed working fluid (at the discharge pressure) to flow through the discharge recess 84 and into the discharge chamber 32. The intermediate passage 86 may provide communication between one of the fluid pockets at the radially intermediate position and the annular recess 88. The annular recess 88 may encircle the discharge recess 84 and may be substantially concentric therewith. The annular recess 88 may include an inner surface 89 and an outer surface 90.

The annular recess 88 may at least partially receive the seal assembly 22 and may cooperate with the seal assembly 22 to define an axial biasing chamber 92 therebetween. The biasing chamber 92 receives fluid from the fluid pocket in the intermediate position through the intermediate passage 86. A pressure differential between the intermediate-pressure fluid in the biasing chamber 92 and fluid in the suction chamber 33 exerts a net axial biasing force on the non-orbiting scroll 64 urging the non-orbiting scroll 64 toward the orbiting scroll 62. In this manner, the tips of the spiral wrap 80 of the non-orbiting scroll 64 are urged into sealing engagement with the end plate 66 of the orbiting scroll 62 and the end plate 78 of the non-orbiting scroll 64 is urged into sealing engagement with the tips of the spiral wrap 68 of the orbiting scroll 62.

As shown in FIGS. 1-4, the seal assembly 22 may include a first or lower annular plate 96, a second or upper annular plate 98, a first annular sealing member 100 (e.g., a lip seal), a third annular sealing member 102 (e.g., a lip seal) and a second annular sealing member 104 (e.g., an O-ring). The first annular plate 96 may include a base 106 and a plurality of projections 108. The base 106 defines a central opening 110 that the end plate 78 of the non-orbiting scroll 64 extends through. The plurality of projections 108 may extend upwardly from the base 106 in an axial direction and may be circumferentially spaced apart from each other around the base 106.

Figure 2:
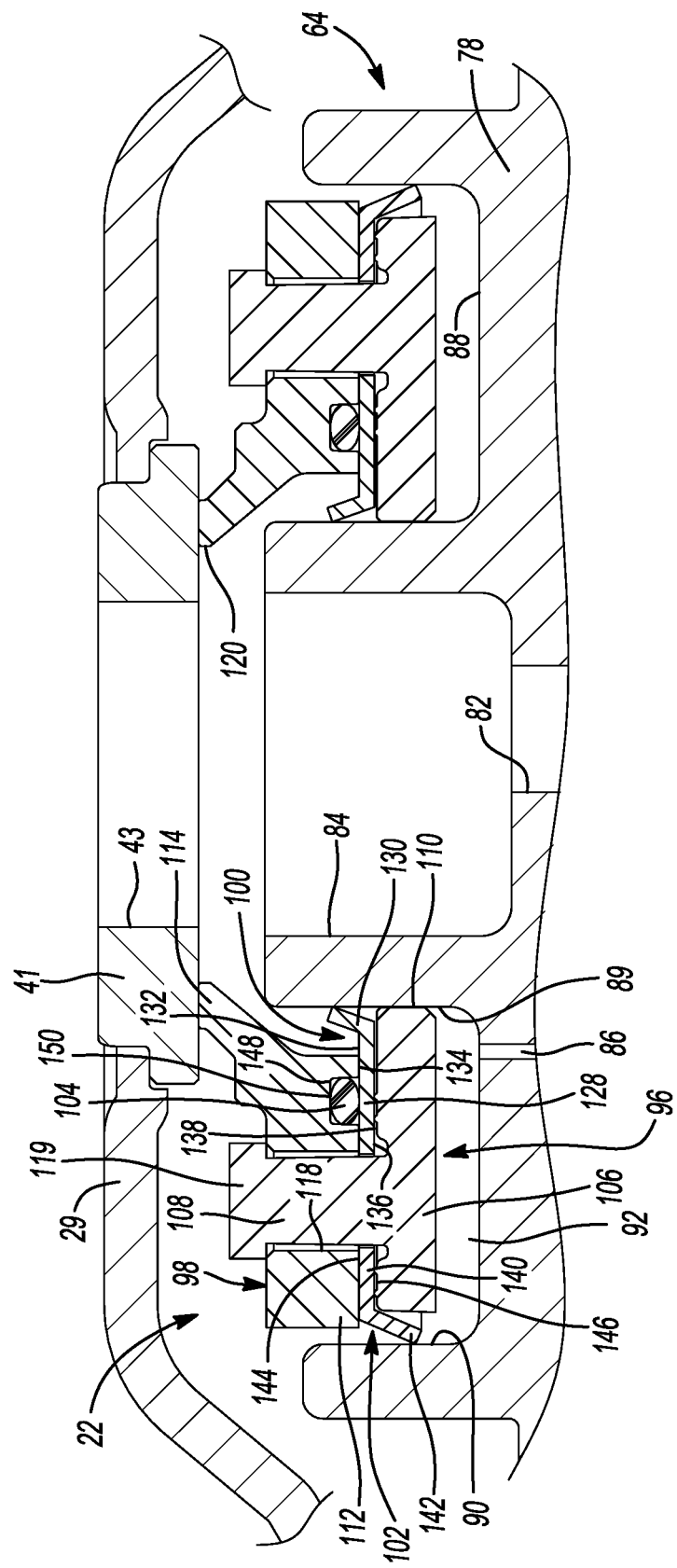
FIG. 2 is a close-up view of the compressor indicated as area 2 in FIG. 1.
Figure 3:
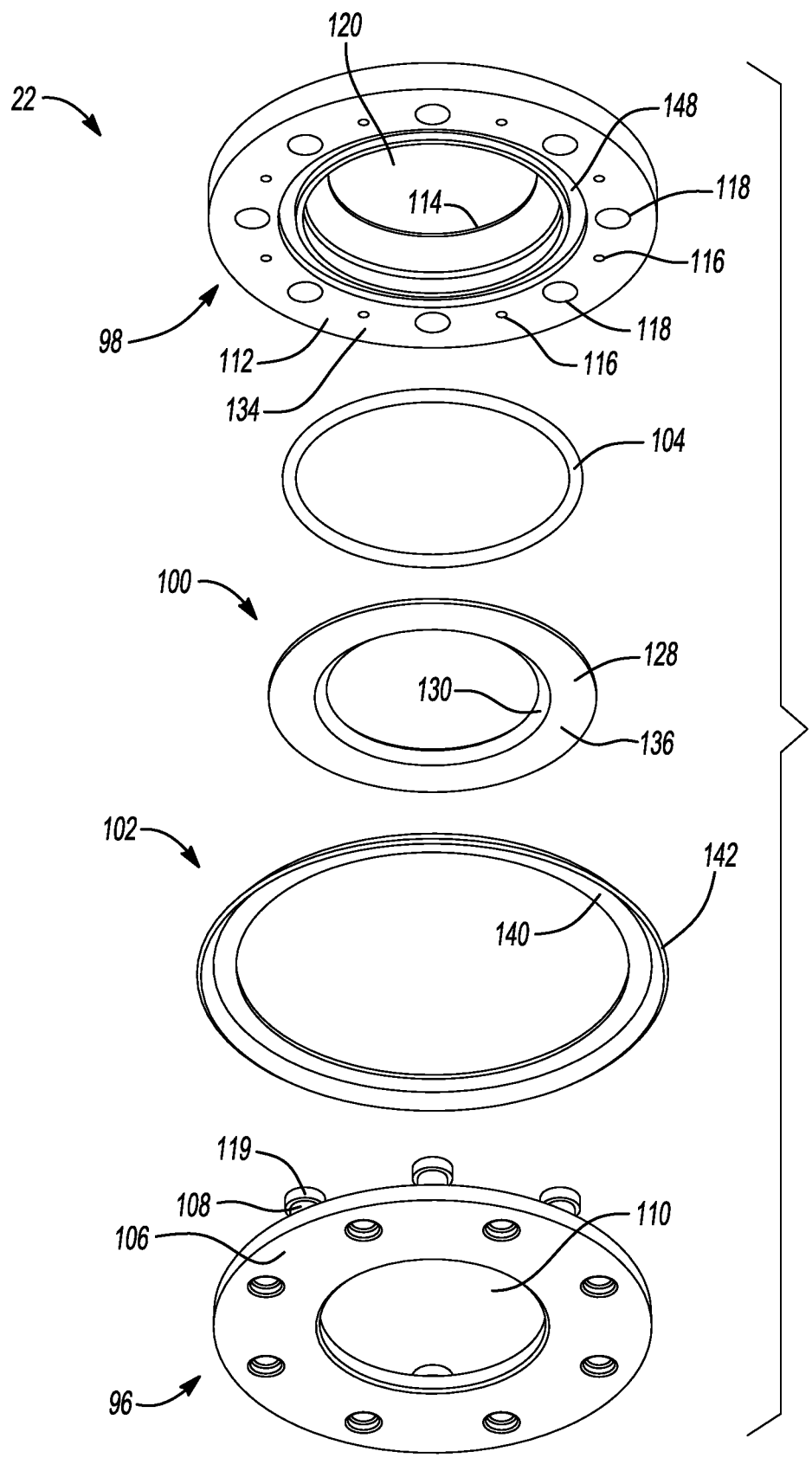
FIG. 3 is an exploded view of the floating seal assembly of FIG. 1.
Figure 4:
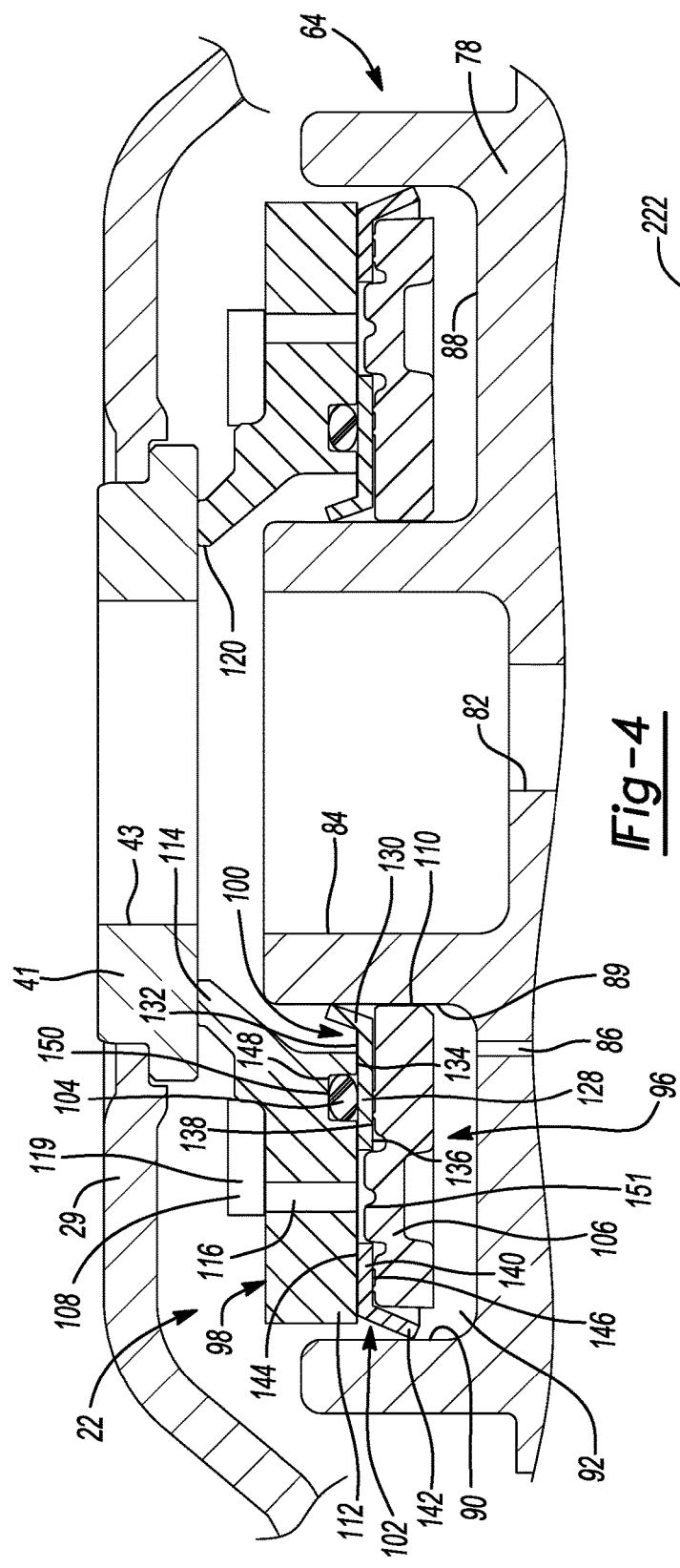
FIG. 4 is a partial cross-sectional view of the compressor of FIG. 1.

The second annular plate 98 may include a base 112 and a lip portion 114. With reference to FIGS. 2-4, the base 112 may include a plurality of vent holes 116 (FIGS. 3 and 4) extending therethrough and a plurality of apertures 118 (FIGS. 2 and 3) extending therethrough. The plurality of vent holes 116 and the plurality of apertures 118 may be arranged in an alternating fashion around the base 112. Each projection 108 may extend through a corresponding aperture 118 of the base 112. Ends 119 of the projections 108 may be swaged or otherwise deformed to secure the first annular plate 96 and the sealing members 100, 102, 104 to the second annular plate 98. In some configurations, additional or alternative means may be employed to secure the first annular plate 96 and the sealing members 100, 102, 104 to the second annular plate 98, such as threaded fasteners and/or welding, for example.

The lip portion 114 may extend upwardly from the base 112 at an inner periphery of the base 112. The lip portion 114 may also at least partially define an opening 120 in the second annular plate 98. The lip portion 114 includes an end that sealingly engages the wear ring 41.

The first annular sealing member 100 may include a planar first portion 128 and a second portion 130. The second portion 130 may extend generally radially inwardly and axially upwardly from the first portion 128. As shown in FIGS. 2 and 4, the first portion 128 may be disposed between the base 106 of the first annular plate 96 and the base 112 of the second annular plate 98. The first portion 128 may have an upper surface 132 sealingly engaged with a lower surface 134 of the base 112 and a lower surface 136 sealingly engaged with an upper surface 138 of the base 106. In this way, fluid in the discharge chamber 32 is restricted from flowing to the suction chamber 33. The second portion 130 may be sealingly engaged with the inner surface 89 of the annular recess 88. In this way, fluid in the discharge chamber 32 is restricted from flowing to the biasing chamber 92.

The third annular sealing member 102 may surround the first annular sealing member 100 and may include a planar first portion 140 and a second portion 142. The second portion 142 may extend generally radially outwardly and axially downwardly from the first portion 140. The first portion 140 may be disposed between the base 106 of the first annular plate 96 and the base 112 of the second annular plate 98. The first portion 140 may have an upper surface 144 sealingly engaged with the lower surface 134 of the base 112 and a lower surface 146 sealingly engaged with the upper surface 138 of the base 106. The second portion 142 may be sealingly engaged with the outer surface 90 of the annular recess 88. In this way, fluid in the biasing chamber 92 is restricted from flowing to the suction chamber 33.

The second annular sealing member 104 may be force-fitted into an annular groove 148 formed in the lower surface 134 of the base 112 so that the second annular sealing member 104 is under compression within the groove 148. The second annular sealing member 104 may be located radially inwardly relative to the vent holes 116 and the apertures 118 of the second plate 98.

The second annular sealing member 104 may be sealingly engaged with a surface 150 of the annular groove 148 and with the upper surface 132 of the first portion 128 of the sealing member 100. In this way, fluid in the discharge chamber 32 is restricted from flowing to the suction chamber 33 especially when the plates 96, 98 undergo thermal expansion. That is, thermal expansion of the first annular plate 96 may cause the second annular plate 98 to move upwardly along the projections 108 of the first annular plate 96. This, in turn, may reduce the force in which the first annular plate 96 is sealed against the first and third annular sealing members 100, 102, and the force in which the second annular plate 98 is sealed against the first and third annular sealing members 100, 102. The second annular sealing member 104 sealed against the upper surface 132 of the sealing member 100 during the upward movement of the second annular plate 98 restricts fluid in the discharge chamber 32 from flowing across the upper surface 132 of the sealing member 100 and into the suction chamber 33 (e.g., via a gap 151 between the sealing members 100, 102 and the vent holes 116).

In some configurations, a fourth annular sealing member (not shown) may be force-fitted into an annular groove (not shown) formed in the upper surface 138 of the base 106 so that the fourth sealing member is under compression within the groove. In such configuration, the fourth annular sealing member may be sealingly engaged with a surface (not shown) of the annular groove and with the lower surface 136 of first annular sealing member 100 so that fluid in the biasing chamber 92 is restricted from flowing to the suction chamber 33, especially during thermal expansion of the plates 96, 98.

It should also be understood that, in some configurations, after the seal assembly 22 is assembled, the vent holes 116 may be sealed off using fasteners (e.g., screws), plugs, or an adhesive (e.g., epoxy), for example, thereby restricting fluid in the discharge chamber 32 from flowing to the suction chamber 33.

Figure 5:
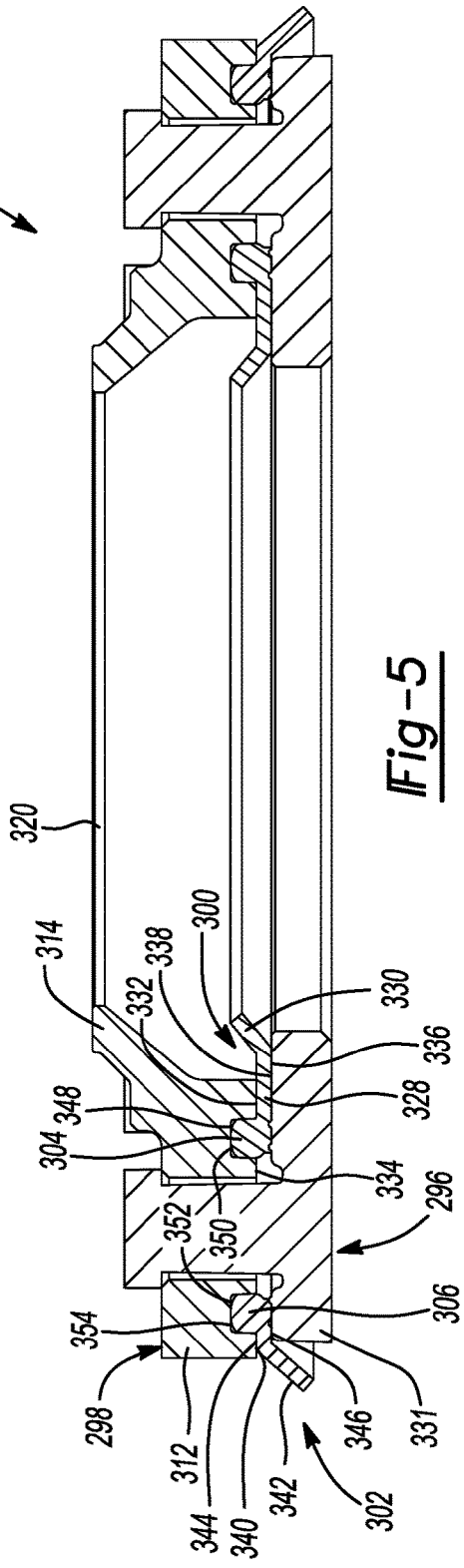
FIG. 5 is a cross-sectional view of another floating seal assembly.
Figure 7:
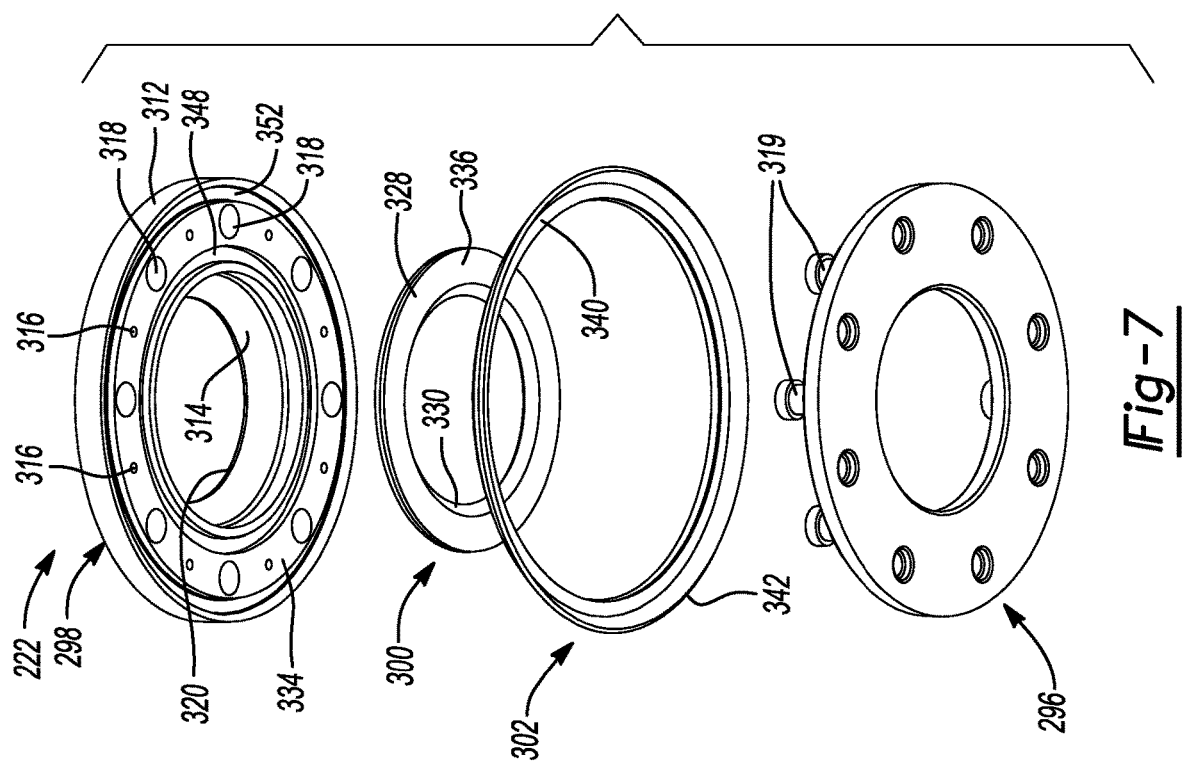
FIG. 7 is another exploded view of the floating seal assembly of FIG. 5.
Figure 6:
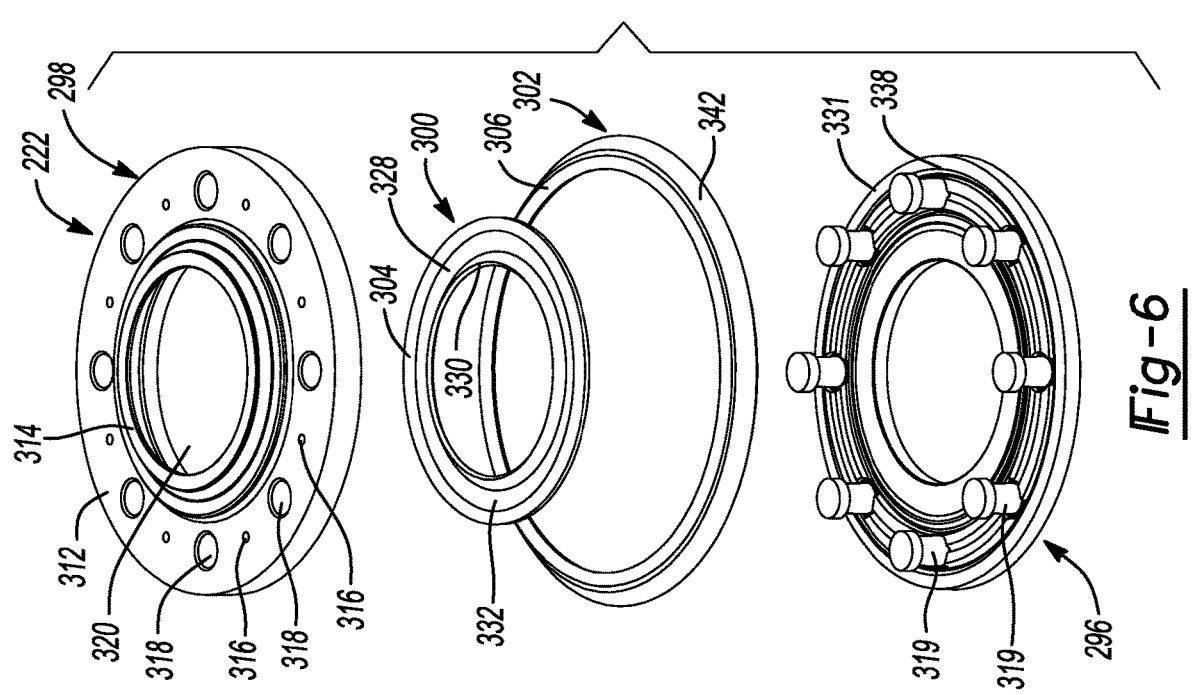
FIG. 6 is an exploded view of the floating seal assembly of FIG. 5.

With reference to FIGS. 5-7, another seal assembly 222 is provided. The seal assembly 222 may be incorporated into the compressor 10 instead of seal assembly 22. The structure and function of the seal assembly 222 may be similar or identical to seal assembly 22 described above, apart from any exception noted below.

The seal assembly 222 may include a first or lower annular plate 296, a second or upper annular plate 298, a first annular sealing member 300, a fourth annular sealing member 302, a second annular sealing member 304 and a third annular sealing member 306. The structure and function of the first annular plate 296 may be similar or identical to that of the annular plate 96 described above, and therefore, will not be described again in detail.

The fourth annular plate 298 may include a base 312 and a lip portion 314. The base 312 defines a plurality of vent holes 316 extending therethrough and a plurality of apertures 318 extending therethrough. The plurality of vent holes 316 and the plurality of apertures 318 are arranged in an alternating fashion around the base 312. Each projection 319 of the first annular plate 296 may extend through a corresponding aperture 318 of the base 312. Ends of the projections 319 may be swaged or otherwise deformed to secure the first annular plate 296 and the sealing members 300, 302, 304, 306 to the second annular plate 298.

The lip portion 314 may extend upwardly from the base 312 at an inner periphery of the base 312. The lip portion 314 may also at least partially define an opening 320 in the second annular plate 298. The lip portion 314 includes an end that sealingly engages the wear ring 41.

The first annular sealing member 300 may include a planar first portion 328 and a second portion 330. The second portion 330 may extend generally radially inwardly and axially upwardly from the first portion 328. The first portion 328 may be disposed between a base 331 of the first annular plate 296 and the base 312 of the second annular plate 298. The first portion 328 may have an upper surface 332 sealingly engaged with a lower surface 334 of the base 312 and a lower surface 336 sealingly engaged with an upper surface 338 of the base 331. In this way, fluid in the discharge chamber 32 is restricted from flowing to the suction chamber 33. The second portion 330 may be sealingly engaged with the inner surface 89 of the annular recess 88. In this way, fluid in the discharge chamber 32 is restricted from flowing to the biasing chamber 92.

The fourth annular sealing member 302 may include a planar first portion 340 and a second portion 342. The second portion 342 may extend generally radially outwardly and axially downwardly from the first portion 340. The first portion 340 may be disposed between the base 331 of the first annular plate 296 and the base 312 of the second annular plate 298. The first portion 340 may have an upper surface 344 sealingly engaged with the lower surface 334 of the base 312 and a lower surface 346 sealingly engaged with the upper surface 338 of the base 331. The second portion 342 may be sealingly engaged with the outer surface 90 of the annular recess 88. In this way, fluid in the biasing chamber 92 is restricted from flowing to the suction chamber 33.

The second annular sealing member 304 may be integrally formed with the first portion 328 of the first sealing member 300 at an outer periphery thereof. The second annular sealing member 304 may be received in an annular groove 348 formed in the lower surface 334 of the base 312 so that the second annular sealing member 304 is under compression within the groove 348. The second annular sealing member 304 may be located radially inwardly relative to the vent holes 316 and the apertures 318 of the second plate 298 and may prevent fluid from flowing from the discharge chamber 32 to the suction chamber 33 via the vent holes 316.

The second annular sealing member 304 may be sealingly engaged with a surface 350 of the annular groove 348. In this way, fluid in the discharge chamber 32 is restricted from flowing to the suction chamber 33, especially when the plates 296, 298 undergo thermal expansion.

The third annular sealing member 306 may be integrally formed with the first portion 340 of the fourth sealing member 302 at an inner periphery thereof. The third annular sealing member 306 may be received in an annular groove 352 formed in the lower surface 334 of the base 312 (the annular groove 352 surrounds the annular groove 348) so that the third annular sealing member 306 is under compression within the groove 352. The third annular sealing member 306 may be located radially outwardly relative to the vent holes 316 and the apertures 318 of the second plate 298. The third annular sealing member 306 may be sealingly engaged with a surface 354 of the annular groove 352.

Figure 8:
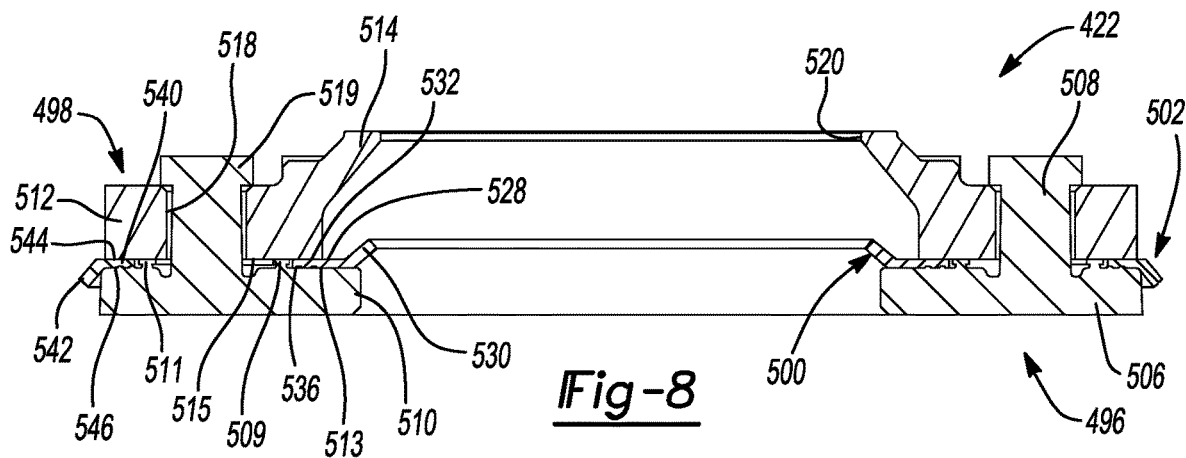
FIG. 8 is a cross-sectional view of yet another floating seal assembly.
Figure 9:
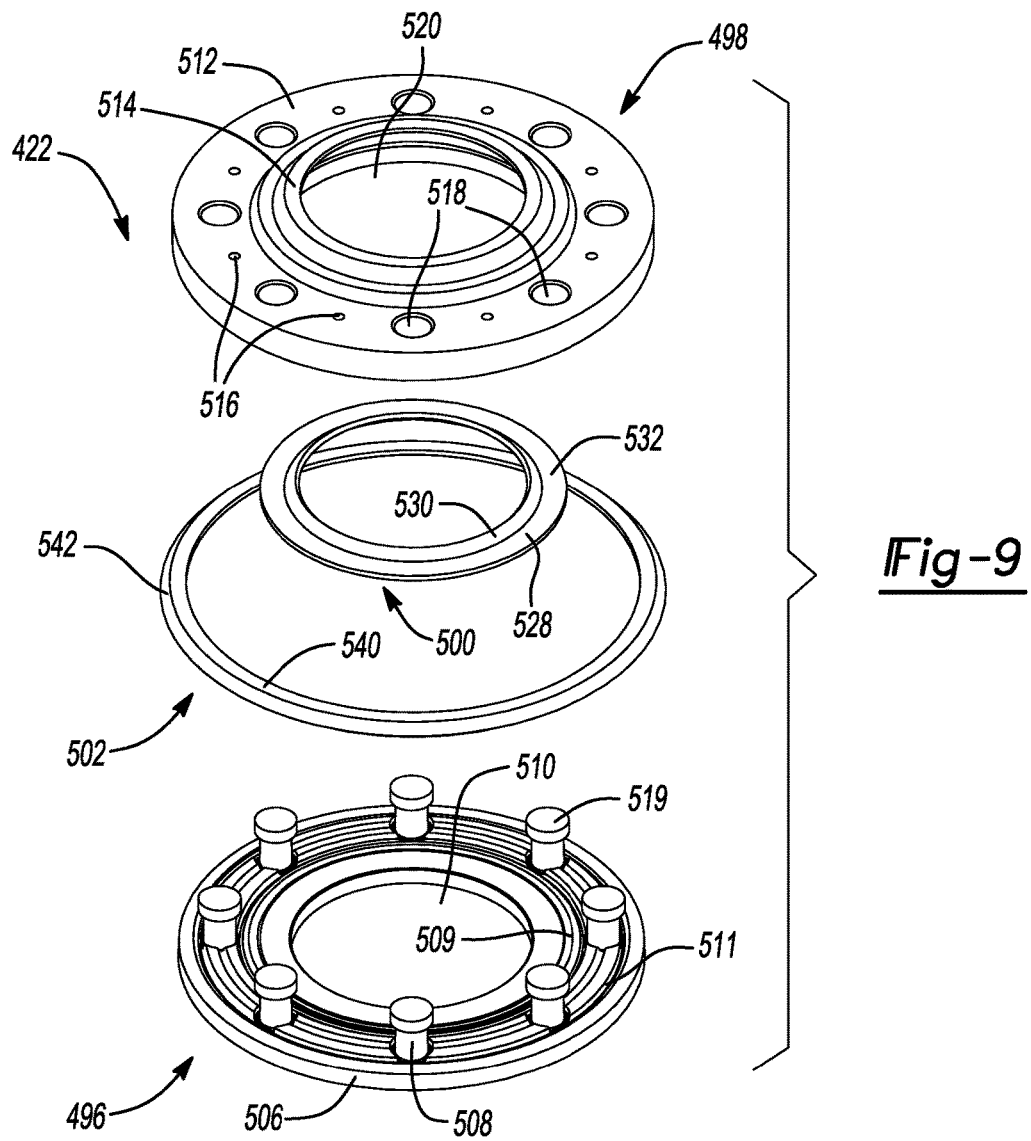
FIG. 9 is an exploded view of the floating seal assembly of FIG. 8.

With reference to FIGS. 8 and 9, another seal assembly 422 is provided. The seal assembly 422 may be incorporated into the compressor 10 instead of seal assemblies 22, 222. The structure and function of the seal assembly 422 may be similar or identical to seal assemblies 22, 222 described above, apart from any exception noted below.

The seal assembly 422 may include a first or lower annular plate 496, a second or upper annular plate 498, a first annular sealing member 500 and a second annular sealing member 502. The first annular plate 496 may include a base 506, a plurality of projections 508, a first annular rib or protrusion 509 and a second annular rib or protrusion 511. The base 506 defines a central opening 510 that the end plate 78 of the non-orbiting scroll 64 extends through. The plurality of projections 508 may extend upwardly from the base 506 in an axial direction and may be circumferentially spaced apart from each other around the base 506.

The first annular rib 509 may extend upwardly in the axial direction from an upper surface 513 of the base 506 and may be positioned radially inwardly relative to the projections 508. The first annular rib 509 may be sealingly engaged with the second annular plate 498. The second annular rib 511 may extend upwardly in the axial direction from the upper surface 513 of the base 506 and may be positioned radially outwardly relative to the projections 508 and the first annular rib 509. The second annular rib 511 may also be sealingly engaged with the second annular plate 498. The first and second annular ribs 509, 511 may be deformed during assembly of the seal assembly 422 to facilitate sealing with the second annular plate 498. In some configurations, the first annular plate 496 may only have the first annular rib 509 (i.e., the second annular rib 511 may be omitted).

The second annular plate 498 may include a base 512 and a lip portion 514. The base 512 defines a plurality of vent holes 516 extending therethrough and a plurality of apertures 518 extending therethrough. The base 512 also has a lower surface 515 that the first and second annular ribs 509, 511 are sealingly engaged with. The plurality of vent holes 516 and the plurality of apertures 518 are arranged in an alternating fashion around the base 512. Each projection 508 of the first annular plate 496 may extend through a corresponding aperture 518 of the base 512. Ends 519 of the projections 508 may be swaged or otherwise deformed to secure the first annular plate 496 and the sealing members 500, 502 to the second annular plate 498.

The lip portion 514 may extend upwardly from the base 512 at an inner periphery of the base 512. The lip portion 514 may also at least partially define an opening 520 in the second annular plate 498. The lip portion 514 includes an end that sealingly engages the wear ring 41.

The first annular sealing member 500 may be positioned radially inwardly relative to the first and second annular ribs 509, 511. The first annular sealing member 500 may include a planar first portion 528 and a second portion 530. The second portion 530 may extend generally radially inwardly and axially upwardly from the first portion 528. The first portion 528 may be disposed between the base 506 of the first annular plate 496 and the base 512 of the second annular plate 498. Stated differently, the first portion 528 may have an upper surface 532 sealingly engaged with the lower surface 515 of the base 512 and a lower surface 536 sealingly engaged with the upper surface 513 of the base 506. The second portion 530 may be sealingly engaged with the inner surface 89 of the annular recess 88.

The second annular sealing member 502 may be positioned radially outwardly relative to the first and second annular ribs 509, 511 (the first and second annular ribs 509, 511 are positioned between the first and second annular sealing members 500, 502). The second annular sealing member 502 may include a planar first portion 540 and a second portion 542. The second portion 542 may extend generally radially outwardly and axially downwardly from the first portion 540. The first portion 540 may be disposed between the base 506 of the first annular plate 496 and the base 512 of the second annular plate 498. Stated differently, the first portion 540 may have an upper surface 544 sealingly engaged with the lower surface 515 of the base 512 and a lower surface 546 sealingly engaged with the upper surface 513 of the base 506. The second portion 542 may be sealingly engaged with the outer surface 90 of the annular recess 88.

The compressor 10 incorporating the sealing assembly 422 described above provides the benefit of restricting fluid in the discharge chamber 32 from flowing to the suction chamber 33 through the vent holes 516 especially when the plates 496, 498 undergo thermal expansion. That is, thermal expansion of the first annular plate 496 may cause the second annular plate 498 to move upwardly along the projections 508 of the first annular plate 496. This, in turn, may reduce the force in which the first annular plate 496 is sealed against the first and second annular sealing members 500, 502, and the force in which the second annular plate 498 is sealed against the first and second annular sealing members 500, 502. The ribs 509, 511 extending from the base 506 of the first annular plate 496 and being made of the same material as the first annular plate 496 will also undergo thermal expansion at the same rate as the base 506 and the projections 508 which maintains sealing between the ribs 509, 511 and the base 512 of the second annular plate 498.

With reference to FIGS. 10 and 11, another seal assembly 622 is provided. The seal assembly 622 may be incorporated into the compressor 10 instead of seal assemblies 22, 222, 422. The structure and function of the seal assembly 622 may be similar or identical to seal assemblies 22, 222, 422 described above, apart from any exception noted below.

The seal assembly 622 may include a first or lower annular plate 696, a second or upper annular plate 698, a first annular sealing member 700 and a second annular sealing member 702. The first annular plate 696 may include a base 706 and a plurality of projections 708. The base 706 defines a central opening 710 that the end plate 78 of the non-orbiting scroll 64 extends through. The plurality of projections 708 may extend upwardly from the base 706 in an axial direction and may be circumferentially spaced apart from each other around the base 706.

The second annular plate 698 may include a base 712, an annular rib or protrusion 713 and a lip portion 714. The base 712 defines a plurality of vent holes 716 extending therethrough and a plurality of apertures 718 extending therethrough. The plurality of vent holes 716 and the plurality of apertures 718 are arranged in an alternating fashion around the base 712. Each projection 708 of the first annular plate 696 may extend through a corresponding aperture 718 of the base 712. Ends 719 of the projections 708 may be swaged or otherwise deformed to secure the first annular plate 696 and the sealing members 700, 702 to the second annular plate 698.

The annular rib 713 may extend downwardly in the axial direction from a lower surface 721 of the base 712 and may be positioned radially inwardly relative to the projections 708. The annular rib 713 may be sealingly engaged with an upper surface 723 of the base 706 of the first annular plate 696.

The lip portion 714 may extend upwardly from the base 712 at an inner periphery of the base 712. The lip portion 714 may also at least partially define an opening 720 in the second annular plate 698. The lip portion 714 includes an end that sealingly engages the wear ring 41.

The first annular sealing member 700 may be positioned radially inwardly relative to the annular rib 713. The first annular sealing member 700 may include a planar first portion 728 and a second portion 730. The second portion 730 may extend generally radially inwardly and axially upwardly from the first portion 728. The first portion 728 may be disposed between the base 706 of the first annular plate 696 and the base 712 of the second annular plate 698. Stated differently, the first portion 728 may have an upper surface 732 sealingly engaged with the lower surface 721 of the base 712 and a lower surface 736 sealingly engaged with the upper surface 723 of the base 706. The second portion 730 may be sealingly engaged with the inner surface 89 of the annular recess 88.

The second annular sealing member 702 may be positioned radially outwardly relative to the annular rib 713 (the annular rib 713 is positioned between the first and second annular sealing members 700, 702). The second annular sealing member 702 may include a planar first portion 740 and a second portion 742. The second portion 742 may extend generally radially outwardly and axially downwardly from the first portion 740. The first portion 740 may be disposed between the base 706 of the first annular plate 696 and the base 712 of the second annular plate 698. Stated differently, the first portion 740 may have an upper surface 744 sealingly engaged with the lower surface 721 of the base 712 and a lower surface 746 sealingly engaged with the upper surface 723 of the base 706. The second portion 742 may be sealingly engaged with the outer surface 90 of the annular recess 88.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A compressor comprising:
   a shell defining a first pressure region and a second pressure region;
   a first scroll member disposed within the shell and including a first end plate and a first scroll wrap, the first end plate defining an annular recess and a discharge passage, the discharge passage in communication with the first pressure region;

a second scroll member including a second end plate and a second scroll wrap, the second scroll wrap meshingly engaging the first scroll wrap to define a compression chamber therebetween; and a seal assembly at least partially disposed in the annular recess and fluidly separating the first and second pressure regions from each other, wherein:

the seal assembly including a first plate, a second plate, a first sealing member and a second sealing member, the first and second plates surrounding the discharge passage, the first sealing member sealingly engaged with the first plate, the second plate, and a surface of the annular recess of the first end plate to restrict fluid flow from the first pressure region to the second pressure region, the second sealing member sealingly engaged with the first sealing member and the first plate to further restrict fluid flow from the first pressure region to the second pressure region, and the second sealing member is spaced apart from the first scroll member.

2. The compressor of claim 1, wherein the second sealing member is an O-ring.

3. The compressor of claim 1, wherein the second sealing member is sealingly engaged with an upper surface of the first sealing member to further restrict fluid flow from the first pressure region to the second pressure region via the upper surface of the first sealing member.

4. The compressor of claim 1, wherein the first pressure region is a discharge pressure chamber and the second pressure region is a suction pressure chamber.

5. The compressor of claim 1, wherein the first plate includes an annular groove formed in a surface thereof, and wherein the second sealing member is disposed within the annular groove and is sealingly engaged with a first upper surface of the first sealing member to further restrict fluid flow from the first pressure region to the second pressure region.

6. The compressor of claim 5, wherein the surface of the first plate faces a second upper surface of the second plate.

7. The compressor of claim 1, wherein the first plate includes a vent hole formed therein and in communication with the second pressure region, and wherein the second sealing member is sealingly engaged with the first sealing member and the first plate at a location radially inwardly relative to the vent hole.

8. A compressor comprising:

a shell defining a first pressure region and a second pressure region;

a first scroll member disposed within the shell and including a first end plate and a first scroll wrap, the first end plate defining a discharge passage, the discharge passage in communication with the first pressure region;

a second scroll member including a second end plate and a second scroll wrap, the second scroll wrap meshingly engaging the first scroll wrap to define a compression chamber therebetween; and a seal assembly fluidly separating the first and second pressure regions from each other, wherein:

the seal assembly including a first plate, a second plate, a first sealing member and a second sealing member, the first plate defining an annular groove formed therein, the first sealing member sealingly engaged with the first plate, the second plate and a surface of the annular recess of the first end plate to restrict fluid flow from the first pressure region to the second pressure region, the second sealing member at least partially disposed within the annular groove and sealingly engaged with a surface of the annular groove to further restrict fluid flow from the first pressure region to the second pressure region, the second sealing member extends from the first sealing member in an axial direction, and the second sealing member is spaced apart from the first scroll member.

9. The compressor of claim 8, wherein the first pressure region is a discharge pressure chamber and the second pressure region is a suction pressure chamber.

10. The compressor of claim 8, wherein the first sealing member and the second sealing member are integrally formed with each other.

11. The compressor of claim 10, wherein the second sealing member is integrally formed with the first sealing member at a periphery of the first sealing member.

12. The compressor of claim 8, wherein the first plate includes a vent hole formed therein and in communication with the second pressure region, and wherein the second sealing member is sealingly engaged with the first plate at a location radially inwardly relative to the vent hole.

13. The compressor of claim 8, wherein the second plate defines a biasing chamber containing fluid at an intermediate fluid pressure, and wherein the first plate defines another annular groove formed therein that a third sealing member is disposed in to restrict fluid flow from the biasing chamber to the second pressure region.

14. The compressor of claim 13, further comprising a fourth sealing member sealingly engaged with the first plate and the second plate, and wherein the third sealing member and the fourth sealing member are integrally formed with the each other.

15. The compressor of claim 14, wherein the first plate includes a vent hole formed therein and in communication with the second pressure region, and wherein the third sealing member is sealingly engaged with a surface of the another annular groove at a location radially outwardly relative to the vent hole.

16. The compressor of claim 14, wherein the third sealing member is integrally formed with the fourth sealing member at a periphery of the fourth sealing member.

* * * * *

UNITED STATES PATENT AND TRADEMARK OFFICE
CERTIFICATE OF CORRECTION

| | | |
|---|---|---|
| PATENT NO. | : 11,692,548 B2 | Page 1 of 1 |
| APPLICATION NO. | : 16/864987 | |
| DATED | : July 4, 2023 | |
| INVENTOR(S) | : James W. McBean et al. | |

It is certified that error appears in the above-identified patent and that said Letters Patent is hereby corrected as shown below:

On the Title Page

Item (73) Assignee:
Please change "Emerson Climate Technologies, Inc." to --Copeland LP, 1675 West Campbell Road, Sidney, OH 45365-0669--

Signed and Sealed this
Twenty-fifth Day of February, 2025

Coke Morgan Stewart
*Acting Director of the United States Patent and Trademark Office*